US012606092B2

(12) United States Patent  
Couperthwaite et al.

(10) Patent No.: US 12,606,092 B2  
(45) Date of Patent: Apr. 21, 2026

(54) CAMERA MIRROR SYSTEM WITH DARK DOCKING IR LED

(71) Applicant: STONERIDGE ELECTRONICS AB, Solna (SE)

(72) Inventors: John Couperthwaite, Ypsilanti, MI (US); Casey A. Viegelahn, Addison, MI (US); Catalin Marius Gafencu, Novi, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 0 days.

(21) Appl. No.: 19/133,561

(22) PCT Filed: Dec. 20, 2022

(86) PCT No.: PCT/US2022/053536  
§ 371 (c)(1),  
(2) Date: May 28, 2025

(87) PCT Pub. No.: WO2024/136853  
PCT Pub. Date: Jun. 27, 2024

(65) Prior Publication Data  
US 2026/0001488 A1 Jan. 1, 2026

(51) Int. Cl.  
*B60R 1/30* (2022.01)  
*B60R 1/26* (2022.01)  
*B60R 11/04* (2006.01)

(52) U.S. Cl.  
CPC .................. *B60R 1/30* (2022.01); *B60R 1/26* (2022.01); *B60R 11/04* (2013.01); *B60R 2300/106* (2013.01)

(58) Field of Classification Search  
CPC .............. B60R 1/30; B60R 1/26; B60R 11/04  
See application file for complete search history.

(56) References Cited

U.S. PATENT DOCUMENTS

| 6,693,524 B1 | 2/2004 | Payne |
| 7,049,945 B2 | 5/2006 | Breed et al. |

(Continued)

FOREIGN PATENT DOCUMENTS

| CN | 101135570 A | 3/2008 |
| CN | 101676149 A | 3/2010 |

(Continued)

OTHER PUBLICATIONS

International Search Report and Written Opinion for International Application No. PCT/US2022/053536 mailed Jul. 21, 2023.

(Continued)

*Primary Examiner* — Kathleen V Nguyen  
(74) *Attorney, Agent, or Firm* — Carlson, Gaskey & Olds, P.C.

(57) ABSTRACT

A method of illuminating a commercial vehicle in low-light conditions includes providing a camera monitor system that includes a scattered IR LED with a first beam angle and a focused IR LED with a second beam angle smaller than the first beam angle. The method includes operating the scattered IR LED in a first condition to provide a diffused IR light alongside the commercial vehicle, and operating the focused IR LED in a second condition that is different than the first condition to provide a focused IR light to an end of the commercial vehicle.

20 Claims, 6 Drawing Sheets

(56) References Cited

U.S. PATENT DOCUMENTS

| | | | |
|---|---|---|---|
| 10,140,525 | B2 | 11/2018 | Lang et al. |
| 10,486,600 | B1 | 11/2019 | Havskjold et al. |
| 11,153,950 | B2 | 10/2021 | van den Brink et al. |
| 11,665,801 | B2 | 5/2023 | van den Brink et al. |
| 12,122,298 | B2 | 10/2024 | van den Brink et al. |
| 2002/0167589 | A1* | 11/2002 | Schofield .................. B60R 1/26 |
| | | | 348/E7.086 |
| 2004/0017282 | A1 | 1/2004 | Eguchi et al. |
| 2005/0041435 | A1 | 2/2005 | Moisel |
| 2006/0115120 | A1 | 6/2006 | Taniguchi et al. |
| 2006/0125919 | A1 | 6/2006 | Camilleri et al. |
| 2006/0197019 | A1 | 9/2006 | Satou |
| 2008/0068520 | A1 | 3/2008 | Minikey, Jr. et al. |
| 2008/0291000 | A1* | 11/2008 | Kim ..................... G01S 7/4813 |
| | | | 340/436 |
| 2009/0072996 | A1 | 3/2009 | Schoepp |
| 2010/0238292 | A1 | 9/2010 | Sato |
| 2011/0193967 | A1 | 8/2011 | Matsumoto et al. |
| 2011/0273527 | A1 | 11/2011 | Liu |
| 2015/0358540 | A1 | 12/2015 | Kanter et al. |
| 2016/0065844 | A1 | 3/2016 | Yao |
| 2017/0048433 | A1 | 2/2017 | Lang et al. |
| 2019/0143908 | A1 | 5/2019 | Koravadi |
| 2020/0267820 | A1 | 8/2020 | van den Brink et al. |
| 2021/0031688 | A1 | 2/2021 | Kawanishi et al. |
| 2021/0155167 | A1 | 5/2021 | Lynam et al. |
| 2021/0245662 | A1 | 8/2021 | Blank et al. |
| 2022/0015208 | A1 | 1/2022 | van den Brink et al. |

FOREIGN PATENT DOCUMENTS

| | | | |
|---|---|---|---|
| CN | 102529812 | A | 7/2012 |
| CN | 102596643 | A | 7/2012 |
| CN | 111731398 | A | 10/2020 |
| CN | 113056391 | A | 6/2021 |
| DE | 29806638 | U1 | 6/1998 |
| DE | 19904043 | A1 | 8/2000 |
| EP | 1466785 | A1 | 10/2004 |
| EP | 1362741 | B1 | 9/2005 |
| EP | 2247098 | A1 | 11/2010 |
| JP | 2000115759 | A | 4/2000 |
| JP | 2002114097 | A | 4/2002 |
| JP | 2002308012 | A | 10/2002 |
| JP | 2004123043 | A | 4/2004 |
| JP | 2005500537 | A | 1/2005 |
| JP | 2006182041 | A | 7/2006 |
| JP | 2007015660 | A | 1/2007 |
| JP | 2007171154 | A | 7/2007 |
| JP | 2008124303 | A | 5/2008 |
| JP | 2009219042 | A | 9/2009 |
| JP | 2009286227 | A | 12/2009 |
| JP | 2010125893 | A | 6/2010 |
| JP | 2012005054 | A | 1/2012 |
| JP | 5003593 | B2 | 8/2012 |
| JP | 2017013784 | A | 1/2017 |
| KR | 20050026128 | A | 3/2005 |
| TW | M504743 | U | 7/2015 |
| WO | 2012003943 | A1 | 1/2012 |
| WO | 2016007799 | A1 | 1/2016 |
| WO | 2016018022 | A1 | 2/2016 |
| WO | 2018189342 | A1 | 10/2018 |
| WO | 2020209005 | A1 | 10/2020 |

OTHER PUBLICATIONS

International Preliminary Report on Patentability for International Application No. PCT/US2022/053536 mailed Nov. 18, 2024.

International Search Report and Written Opinion for International Application No. PCT/EP2020/053647 mailed Jun. 24, 2020.

European Search Report for European Application No. 23190391.5 mailed Dec. 18, 2023.

Search Report and Written Opinion for International Application No. PCT/EP2019/082922 mailed Mar. 24, 2020.

Examination Report for European Application No. 19832563.1 mailed Dec. 12, 2023.

U.S. Appl. No. 17/979,285, filed Nov. 2, 2022.

European Search Report for European Application No. 22206810.8 mailed Mar. 16, 2023.

Chinese Office Action for Chinese Application No. 2022801027112 mailed Jan. 27, 2026.

\* cited by examiner

CAMERA MIRROR SYSTEM WITH DARK DOCKING IR LED

TECHNICAL FIELD

This disclosure relates to a camera monitor system (CMS) for use in a commercial truck or similar vehicle, and, in particular, to a CMS IR LEDs for improved vision at night.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the CMS covers a larger field of view than a conventional mirror, or include views that are not fully obtainable via a conventional mirror.

In a typical CMS, there is a camera arm arranged on each of the left- and right-hand sides of the vehicle to provide Class II and Class IV views. A display is provided on the A-pillar on both driver and passenger sides to display the field of view for the camera arm on that side, simulating a conventional mirror.

Driving a commercial vehicle at night is challenging due to poor visibility. The use of infrared light emitting diodes (IR LEDs) has been proposed for CMS systems to increase visibility at night. IR LEDs generate heat that must be managed during use. IR LEDs have various other limitations that limit their usefulness during typical driving maneuvers.

SUMMARY

In one exemplary embodiment, a method of illuminating a commercial vehicle in low-light conditions includes providing a camera monitor system that includes a scattered IR LED with a first beam angle and a focused IR LED with a second beam angle smaller than the first beam angle. The method further includes operating the scattered IR LED in a first condition to provide a diffused IR light alongside the commercial vehicle. The method further includes operating the focused IR LED in a second condition that is different than the first condition to provide a focused IR light to an end of the commercial vehicle.

In a further embodiment of any of the above, the scattered and focused IR LEDs each have at least one of a primary optic and a secondary optic. The at least one of the primary optics and the secondary optics are different than one another to provide the different first and second beam angles.

In a further embodiment of any of the above, the focused IR LED operating step includes illuminating a vertical target area that is a distance of 14 m to 22 m from the focused IR LED adjacent to the end and a portion of the ground and vehicle between the vertical target area and the focused IR LED itself.

In a further embodiment of any of the above, the focused IR LED operating step includes illuminating the vertical target area that is 0.5 m to 1.5 m from a ground on which the commercial vehicle rests.

In a further embodiment of any of the above, the focused IR LED provides an IR light intensity at the target area of at least 0.4 $\mu$W/cm$^2$.

In a further embodiment of any of the above, the IR light intensity is at least 1.0 $\mu$W/cm$^2$.

In a further embodiment of any of the above, the IR light intensity is at least 3.0 $\mu$W/cm$^2$.

In a further embodiment of any of the above, target area is movable relative to the focused IR LED based upon a trailer angle relative to a tractor. The focused IR LED operating step includes training the focused IR LED onto the target area.

In another exemplary embodiment, a camera arm for a vehicle camera monitor system includes a housing, a camera that is mounted to the housing and configured to provide a field of view along a trailer, a scattered IR LED in proximity to the housing and with a first beam angle, and a focused IR LED in proximity to the housing and with a second beam angle smaller than the first beam angle.

In a further embodiment of any of the above, a vehicle camera monitor system includes the camera arm. The system is configured to provide diffused IR light to a first target area alongside the trailer, and the system is configured to provide focused IR light to a second target area at an end of the trailer.

In a further embodiment of any of the above, the system includes a display that is in communication with the camera and configured to be mounted in a tractor. The display is configured to illustrate the field of view. The field of view corresponds to at least one of a Class II view and a Class IV view.

In a further embodiment of any of the above, the system includes a controller that is configured to operate the scattered IR LED in a first condition to provide a diffused IR light to the first target area. The controller is configured to operate the focused IR LED in a second condition that is different than the first condition to provide a focused IR light to the second target area.

In a further embodiment of any of the above, the system includes at least one input that is in communication with the controller. The controller is configured to determine the first and second conditions from the at least one input.

In a further embodiment of any of the above, the at least one input includes an ambient light sensor, a reverse switch, image recognition software, a steering angle sensor, a vehicle speed sensor, and/or a manual switch.

In a further embodiment of any of the above, the second target area is movable relative to the focused IR LED based upon a trailer angle that is relative to the tractor. The controller is configured to train the focused IR LED onto the second target area during movement.

In a further embodiment of any of the above, the camera arm is mounted to the tractor which is connected to the trailer. The second target area is of a vertical target area that is a distance of 14 m to 22 m from the focused IR LED that is adjacent to the end and 0.5 m to 1.5 m from a ground on which the trailer rests and includes a portion of the ground and vehicle between the vertical target area and the focused IR LED itself.

In a further embodiment of any of the above, the focused IR LED provides an IR light intensity at the target area of at least 0.4 $\mu$W/cm$^2$.

In a further embodiment of any of the above, the IR light intensity is at least one of 1.0 $\mu$W/cm$^2$ or 3.0 $\mu$W/cm$^2$.

In a further embodiment of any of the above, the scattered and focused IR LEDs each include at least one of a primary optic and a secondary optic. The at least one of the primary optics and the secondary optics are different than one another to provide the different first and second beam angles.

In a further embodiment of any of the above, the scattered IR LED has a lens that is different than a lens of the focused IR LED.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
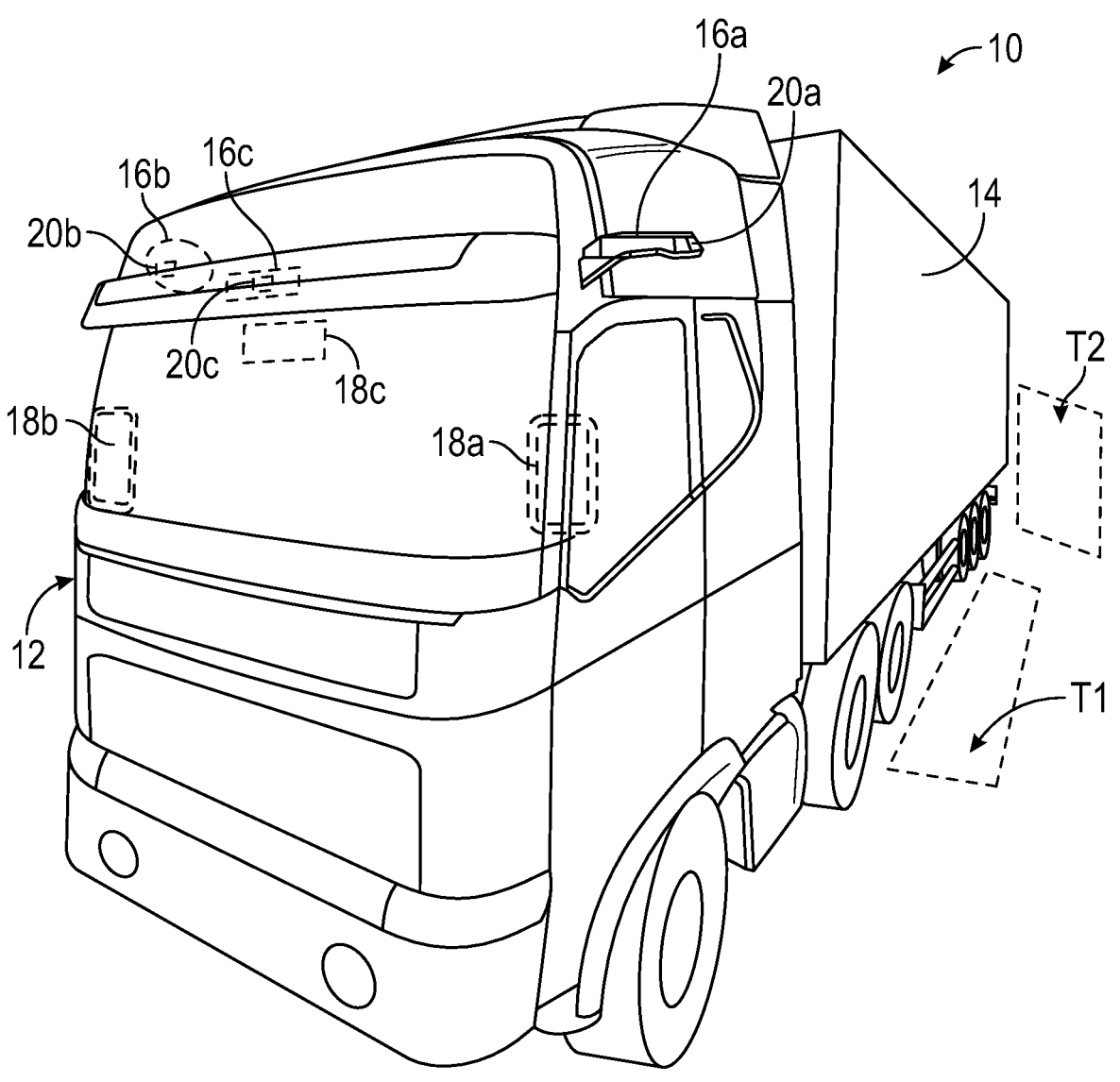
FIG. 1A is a schematic front view of a commercial truck with a camera monitor system (CMS) used to provide at least Class II and Class IV views.
Figure 1B:
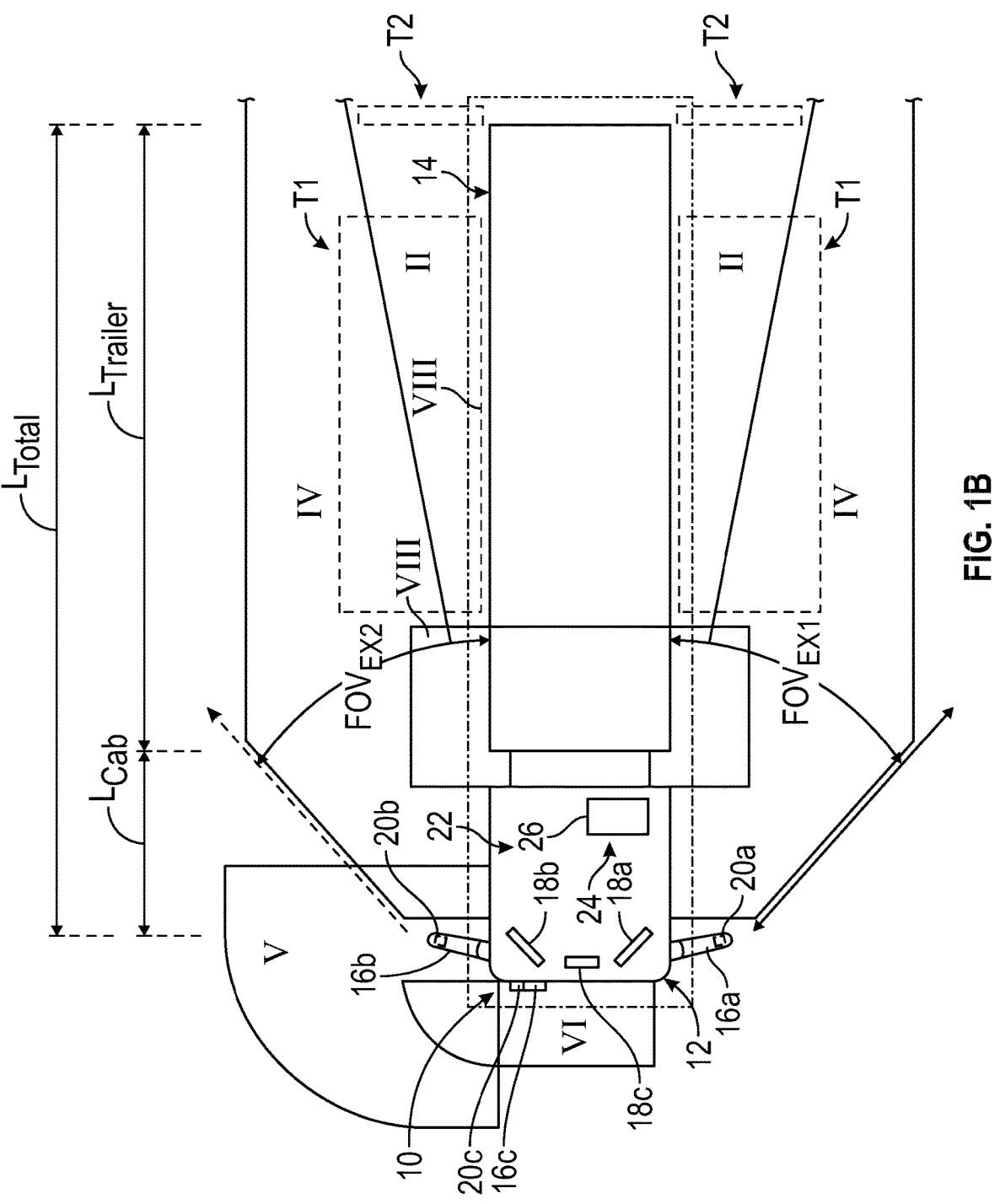
FIG. 1B is a schematic top view of a commercial truck with a camera mirror system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used in some examples to entirely replace mirrors. In additional examples, each side can include multiple camera arms, each arm housing one or more cameras and/or mirrors. Each arm 16a, 16b may also provide a housing that encloses electronics, e.g., a controller, that are configured to provide various features of the CMS 15.

Each of the camera arms 16a, 16b includes a base that is secured to, for example, the cab 12. A pivoting arm is supported by the base and may articulate relative thereto. At least one rearward facing camera 20a, 20b is arranged respectively within camera arms 16a, 16b. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16a, 16b to provide these views, if desired. Class II and Class IV views are defined in European R46 legislation, for example, and the United States and other countries have similar driver visibility requirements for commercial trucks. Any reference to a "Class" view is not intended to be limiting, but is intended as exemplary for the type of view provided to a display by a particular camera.

First and second video displays or monitors 18a, 18b are arranged on each of the driver and passenger sides within the vehicle cab 12 on or near the A-pillars 19a, 19b (generally, A-pillar 19) to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c (generally, display 18) face a driver region 24 within the cabin 22 where a driver/operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class VIII views. Alternatively, additional displays can be added near the first, second and third displays 18a, 18b, 18c and provide a display dedicated to providing a Class VIII view.

Figure 2:
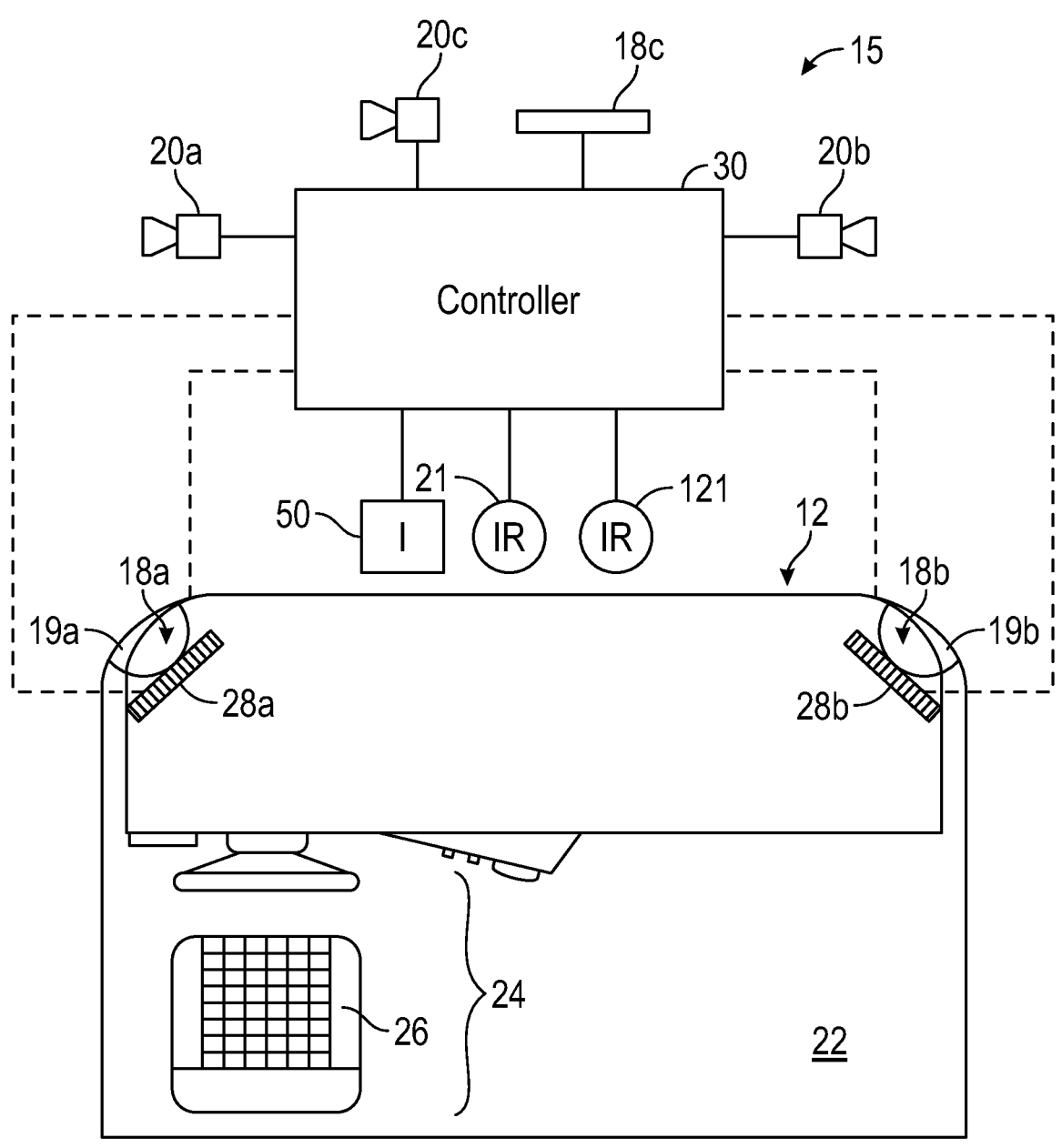
FIG. 2 is a schematic top view of a vehicle cabin including displays.

Referring to FIG. 2, each display 18a, 18b (and perhaps others, if desired) includes a housing mounted to its respective A-pillar 19 (i.e., 19a, 19b) by a bracket, for example, or integrated into vehicle trim. A screen 28 (i.e., 28a, 28b) is mounted in a front of the housing facing the driver. The screen 28 can be any suitable screen such as TFT, LCD, LED, OLED and others. A controller 30 communicates with the cameras 20 and the displays 18 and may perform image processing, perform algorithms related to CMS functions, or include other desired features of the CMS 15.

Referring to FIGS. 1A and 1B, there are particular areas around the vehicle 10 that must be monitored by a driver during operation, which include first and second target areas T1, T2. The first target area T1 is alongside the trailer 14, and the second target area T2 is arrange at or near the end of the trailer 14.

These target areas are especially important to monitor during reverse or docking maneuvers, particularly at night. Prior art CMS with IR LED might provide some infrared illumination in the first target area T1, but no illumination has been provided in the second target area T2 as any IR light is far to diffused such that the intensity is effectively 0.00 $\mu W/cm^2$ at the trailer end. The second target area T2 covers a vertical target area adjacent to the trailer and as well as a portion of the ground and the vehicle between the vertical target area and the focused IR LED itself (e.g., generally, the ground adjacent the trailer end. Thus, such systems essentially leave the driver blind at night with respect the end of the trailer 14.

To address the above-described deficiencies, the disclosed CMS 15 uses both a scattered IR LED 21 and a focused IR LED 121 as shown in FIG. 2. Each of the IR LEDs 21, 121 may be provided by one or more individual IR LEDs, if desired. The scattered IR LED 21 and focused IR LED 121 are configured to respectively illuminated the first and second target areas T1, T2 with infrared light, thereby providing the driver with sufficient nighttime visibility during operation of the vehicle. The IR LEDs 21, 121 are operated by the controller 30 in response to one or more inputs 50. The inputs 50 include at least one of an ambient light sensor, a reverse switch, image recognition software, a steering angle sensor, and/or a vehicle speed sensor. The IR LEDs 21, 121 may also be controlled via a manual input button or combination of buttons through a menu structure.

A typical trailer 14 has a length $L_{trailer}$ in a range of 12 m to 20 m, and the camera arms 16 are about 2 m from the front of the trailer ($L_{cab}$). So, generally, the camera arms 16 are mounted to the tractor 12 at a distance $L_{total}$ from the trailer end, which is typically a distance of 14 m to 22 m from the focused IR LED 121. The bottom of the trailer 14 is about 0.5 m to 1.5 m (i.e., the trailer deck) from a ground on which the trailer rests. Thus, the second target area T2 is 14 m to 22 m from the focused IR LED 121 and 0.5 m to 1.5 m above grade. It is desirable to illuminate the second target area T2 with an infrared light intensity of at least 0.4 $\mu W/cm^2$. In another example, the focused IR LED 121 provides an IR light intensity at the second target T2 of at least 1.0 $\mu W/cm^2$, and in another example, the IR light intensity is at least 3.0 $\mu W/cm^2$.

Current IR LEDs do not provide any focused IR light desired at the trailer end. The differing lights are provided by IR LEDs having a different design. The scattered and focused IR LEDs 21, 121 each include at least one of a primary optic and a secondary optic. As an alternative, instead of separate, discrete IR LEDs, a compound lens, a bifocal lens, a shaved lens and/or similar lens to these could provide both the focused IR LED and the scattered IR LED. This second target area T2 may also include the dock, the trailer, trailer wheels, and ground adjacent to the wheels (e.g, areas in need of high visibility during nighttime docking/reversing maneuvers). An example of a primary optic is lens design, include lens shape. Examples of secondary optics are reflectors and TIR optics.

Figure 3:
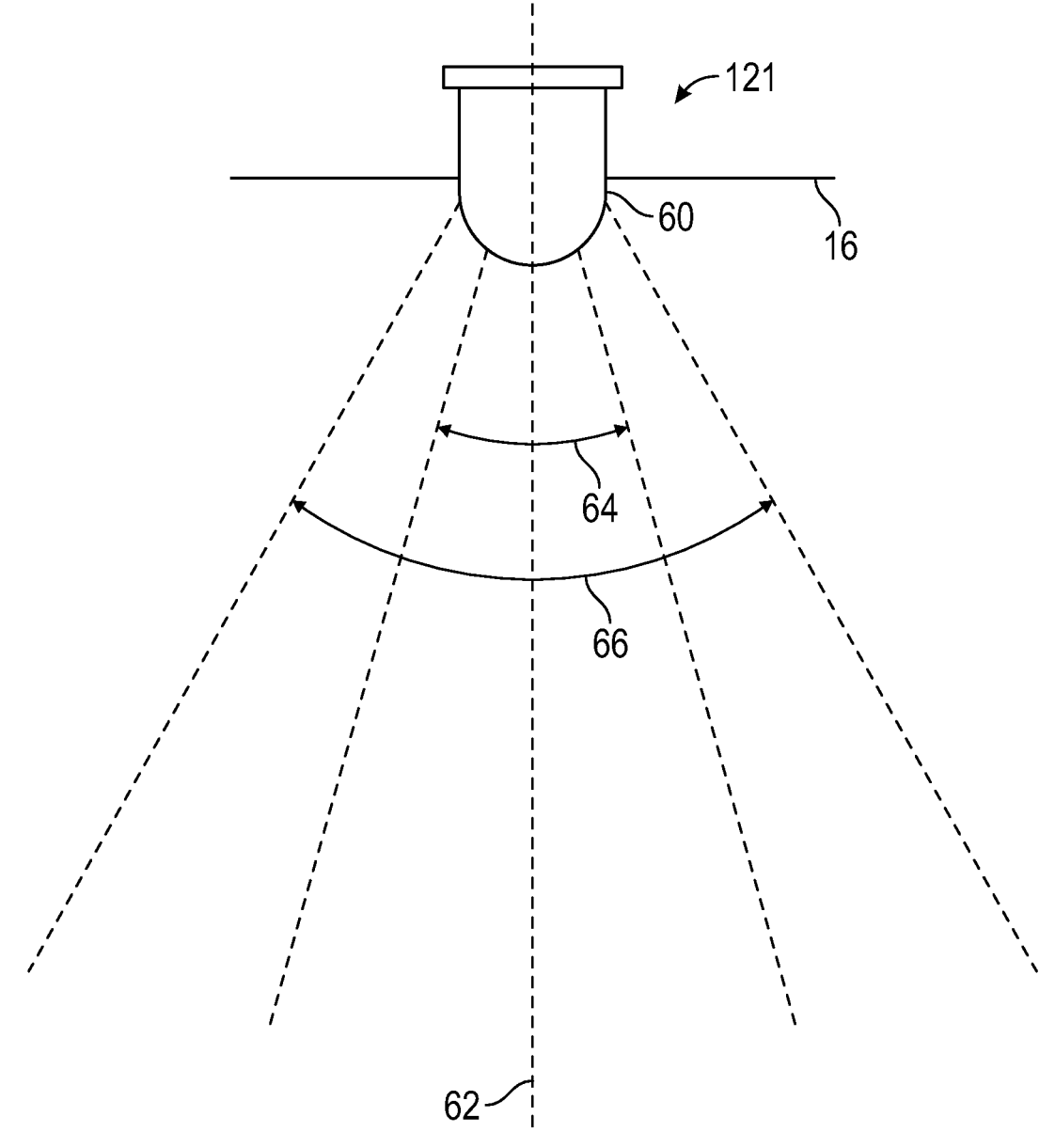
FIG. 3 is a schematic view of an IR LED and its lighting characteristics.

Referring to FIG. 3, the focused IR LED 121 has a lens 60 that has a beam axis 62 along which the IR light has the highest intensity. The infrared light intensity gradually decreases from the beam axis 62. The beam angle 64 is the angle at which the light intensity reaches 50% of the maximum light intensity, and the field angle 66 is the angle at which the light intensity reaches 10% of the maximum light intensity. The at least one of the primary optics and the secondary optics are different than one another to provide the different first and second beam angles. In the example, the scattered IR LED 21 has a lens that is different than a lens of the focused IR LED 121. The scattered IR LED 21 will have a wide beam angle for illuminating the first target area T1, and the focused IR LED will have a much narrow beam angle in order to reach the second target area T2 and provide sufficient illumination for the driver.

Figure 4:
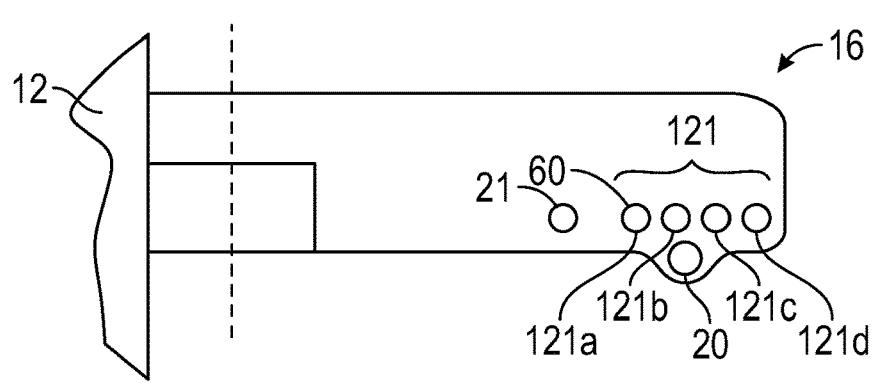
FIG. 4 schematically illustrates a camera arm having a scattered IR LED and a focused IR LED for respectively illuminating first and second target areas shown in FIGS. 1A and 1B.

A housing of the camera arm 16 is schematically shown in FIG. 4. The camera 20 provides Class II and/or Class IV views, which encompass the first and second target areas T1, T2. The displays 18 are configured to illustrate the field of view, but in low-light conditions (e.g., below 1 lux) the camera 20 cannot display 18 a useful image without the field of view being illuminated by IR light. To this end, the scattered IR LED 21 is in proximity to (e.g., mounted to) the housing and provides a first beam angle, and the focused IR LED 121 is in proximity to (e.g., mounted to) the housing and provides a second beam angle smaller than the first beam angle. In this manner, diffused IR light is provided to the first target area T1, and focused IR light is provided to the second target area T2.

While the CMS 15 may turn the IR LEDs ON and OFF together under some circumstances if desired, it may also be desirable to illuminate each of the target areas during different scenarios based upon different operating condition. For example, the controller 30 is configured to operate the scattered IR LED 21 in a first condition to provide a diffused IR light to the first target area T1. The first condition may be general nighttime driving while the vehicle 10 is travelling in a forward direction, which provides diffused light without "hot spots" that could distract from or obscure visibility of objects outside the immediate target area (i.e., scattered IR LED ON only). In another example, the controller 30 is configured to operate the focused IR LED 121 in a second condition different than the first condition to provide a focused IR light to the second target area T2. The second condition may correspond to a nighttime reverse docking maneuver (e.g., both scattered IR LED ON and focused IR LED, as the scattered IR LED can also be beneficial). It may also be desirable to illuminate the first target area T1 during nighttime reverse to provide improved visibility. The inputs 50 are used by the controller 30 to identify the conditions and operate the IR LEDs as desired.

Figure 6:
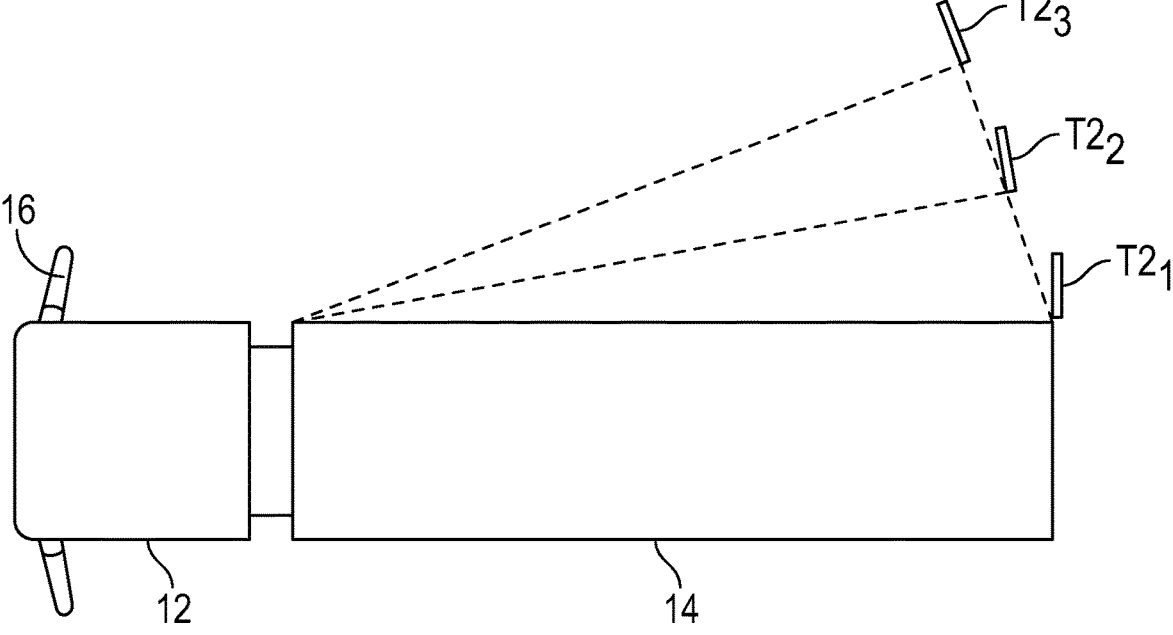
FIG. 6 is a plan view demonstrating different positions of the second target area that the focused IR LED of FIG. 4 or 5 are trained upon during vehicle maneuvers.

The second target area T2 is movable (e.g., T21, T22, T23 in FIG. 6) relative to the focused IR LED 121 on the tractor 12 based upon a trailer angle relative to the tractor 12, i.e., during turning maneuvers. In one example, the controller 30 is configured to train the focused IR LED 121 onto the second target area T2 during movement so that the trailer end remain illuminated with IR light.

In one example shown in FIG. 4, the focused IR LED 121 is provided by an array of multiple, discrete IR LEDs 121*a*, 121*b*, 121*c*, 121*d*. When the trailer 14 is at or near a 0° trailer angle, the IR LED 121*a* closest to the tractor 12 is turned ON while the others are turned OFF. As the trailer angle increases, the IR LEDs farther away from the tractor may be turned ON while the others are switched OFF. In this manner, the focused IR LED illumination is effective moved with the trailer end.

Figure 5:
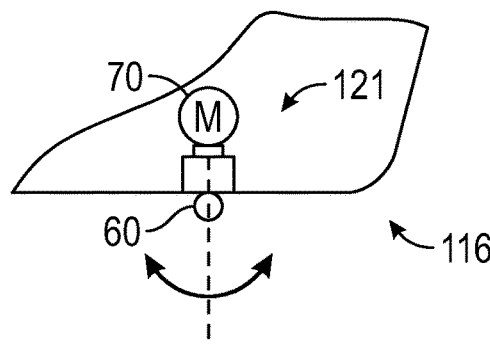
FIG. 5 illustrates a movable IR LED.

In another example shown in FIG. 5, the focused IR LED 121 includes a motor 70 in the camera arm 116 that moves the beam axis with the trailer end. This may also be accomplished by moving the camera arm about a pivot in the case of power folding camera arms.

Figure 7:
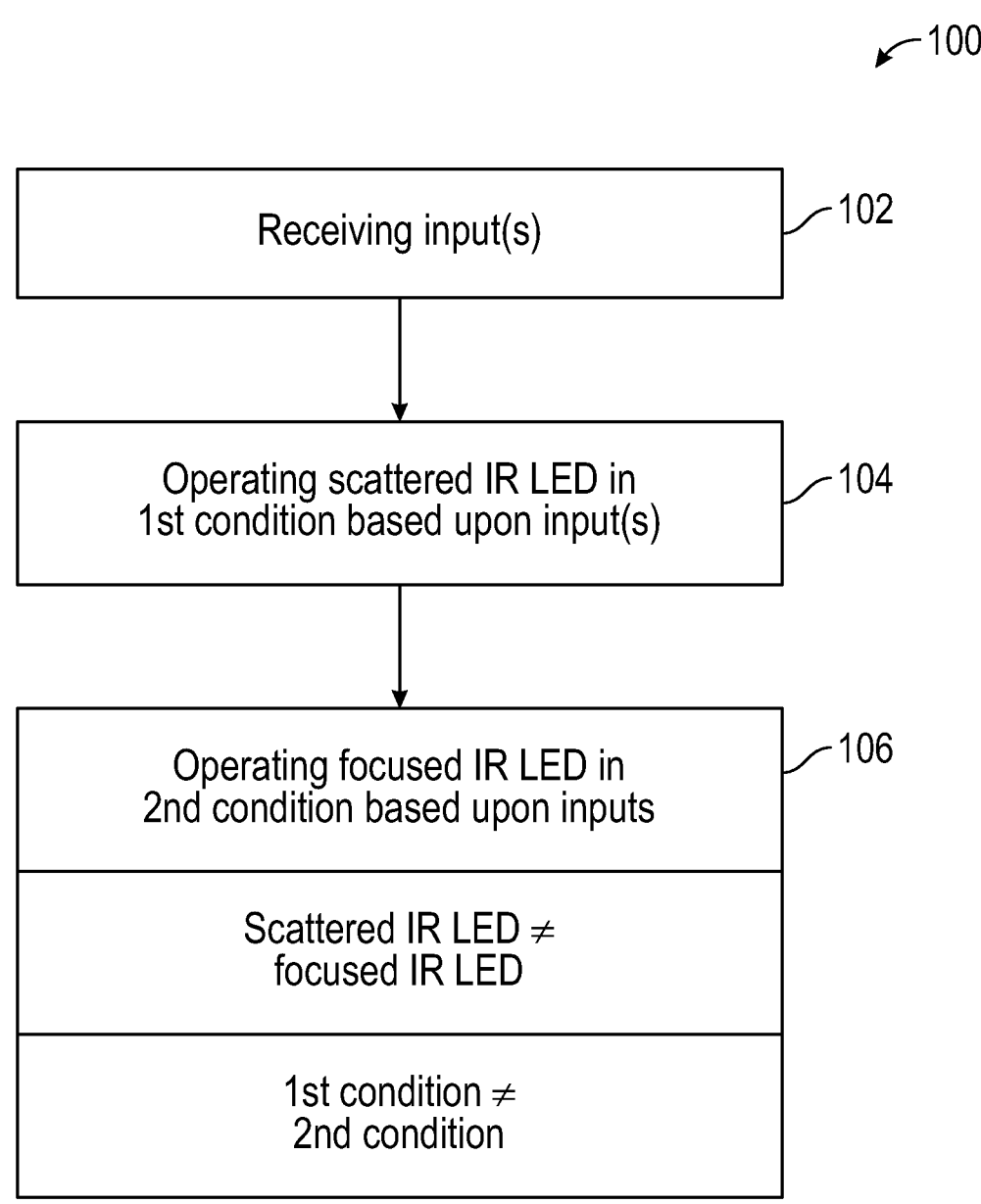
FIG. 7 is a method of illuminating a commercial vehicle in low-light conditions.

A method 100 of illuminating a commercial vehicle in low-light is shown in FIG. 7. The controller 30 receives various inputs 50 (block 102), which enables the controller to determine whether and which IR LED may be needed. The method 100 includes providing a scattered IR LED light with a first beam angle in a first condition (block 104). The method 100 provides a focused IR LED light with a second beam angle smaller than the first beam angle (block 106). Thus, in operation, the scattered IR LED is operated in the first condition to provide a diffused IR light alongside the commercial vehicle, and the focused IR LED is operated in a second condition different than the first condition to provide a focused IR light to an end of the commercial vehicle.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory. The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The disclosed CMS 15 provides a distinct IR LED disposed on an outer extremity of the CMS suitable for illuminating the trailer end in nighttime docking.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of illuminating a commercial vehicle in low-light conditions, comprising:

providing a camera monitor system including a scattered IR LED with a first beam angle and a focused IR LED with a second beam angle smaller than the first beam angle;

operating the scattered IR LED in a first condition to provide a diffused IR light alongside the commercial vehicle; and operating the focused IR LED in a second condition different than the first condition to provide a focused IR light to an end of the commercial vehicle.

2. The method of claim 1, wherein the scattered and focused IR LEDs each have at least one of a primary optic and a secondary optic, the at least one of the primary optics and the secondary optics are different than one another to provide the different first and second beam angles.

3. The method of claim 1, wherein the focused IR LED operating step includes illuminating a vertical target area that is a distance of 14 m to 22 m from the focused IR LED adjacent to the end and a portion of the ground and vehicle between the vertical target area and the focused IR LED itself.

4. The method of claim 3, wherein the focused IR LED operating step includes illuminating the vertical target area that is 0.5 m to 1.5 m from a ground on which the commercial vehicle rests.

5. The method of claim 4, wherein the focused IR LED provides an IR light intensity at the target area of at least 0.4 $\mu W/cm^2$.

6. The method of claim 5, wherein the IR light intensity is at least 1.0 $\mu W/cm^2$.

7. The method of claim 6, wherein the IR light intensity is at least 3.0 $\mu W/cm^2$.

8. The method of claim 3, wherein target area is movable relative to the focused IR LED based upon a trailer angle relative to a tractor, and the focused IR LED operating step includes training the focused IR LED onto the target area.

9. A camera arm for a vehicle camera monitor system for a vehicle with a trailer, comprising:

a housing;

a camera mounted to the housing and configured to provide a field of view along a trailer;

a scattered IR LED in proximity to the housing and including at least one of a scattered primary optic and a scattered secondary optic configured to deliver a diffused IR light to a first target area, the scattered IR LED has a first beam angle at which the scattered IR LED light intensity reaches 50% of its maximum light intensity; and a focused IR LED in proximity to the housing and including at least one of a focused primary optic and a focused secondary optic configured to deliver a focused IR light to a second target area, wherein the second target area is of a vertical target area that is a distance of 14 m to 22 m from the focused IR LED configured to be adjacent to an end of a trailer and 0.5 m to 1.5 m from a ground on which the trailer rests and including a portion of the ground and vehicle between the vertical target area and the focused IR LED itself, the focused IR LED has a second beam angle at which the focused IR LED light intensity reaches 50% of its maximum light intensity, wherein at least one of the scattered and focused primary optics and the scattered and focused secondary optics are different than one another to provide the second beam angle smaller than the first beam angle.

10. A vehicle camera monitor system comprising the camera arm of claim 9, the system configured to provide diffused IR light to a first target area alongside the trailer, and the system configured to provide focused IR light to a second target area at an end of the trailer.

11. The system of claim 10, comprising a display in communication with the camera and configured to be mounted in a tractor, the display configured to illustrate the field of view, wherein the field of view corresponds to at least one of a Class II view and a Class IV view.

12. The system of claim 11, comprising a controller configured to operate the scattered IR LED in a first condition to provide a diffused IR light to the first target area, and the controller configured to operate the focused IR LED in a second condition different than the first condition to provide a focused IR light to the second target area.

13. The system of claim 12, comprising at least one input in communication with the controller, the controller configured to determine the first and second conditions from the at least one input.

14. The system of claim 13, wherein the at least one input includes an ambient light sensor, a reverse switch, image recognition software, a steering angle sensor, a vehicle speed sensor, and/or a manual switch.

15. The system of claim 14, wherein second target area is movable relative to the focused IR LED based upon a trailer angle relative to the tractor, and the controller is configured to train the focused IR LED onto the second target area during movement.

16. The system of claim 11, wherein the camera arm is mounted to the tractor which is connected to the trailer.

17. The system of claim 11, wherein the focused IR LED provides an IR light intensity at the target area of at least 0.4 $\mu W/cm^2$.

18. The system of claim 16, wherein the IR light intensity is at least one of 1.0 $\mu W/cm^2$ or 3.0 $\mu W/cm^2$.

19. The camera arm of claim 9, wherein the scattered and focused IR LEDs each include at least one of a primary optic and a secondary optic, the at least one of the primary optics and the secondary optics are different than one another to provide the different first and second beam angles.

20. The camera arm of claim 19, wherein the scattered IR LED has a lens that is different than a lens of the focused IR LED.

\* \* \* \* \*